(12) United States Patent
McFarland et al.

(10) Patent No.: US 7,286,949 B2
(45) Date of Patent: Oct. 23, 2007

(54) METHOD OF ERROR CORRECTION

(75) Inventors: Geoffrey McFarland, Gloucestershire (GB); Kevyn B. Jonas, Bristol (GB); James F. Robertson, Roxburghshire (GB); Nicholas J. Weston, Peebleshire (GB); Kenneth C. H. Nai, Bristol (GB)

(73) Assignee: Renishaw plc, Gloucestershire (GB)

( * ) Notice: Subject to any disclaimer, the term of this patent is extended or adjusted under 35 U.S.C. 154(b) by 0 days.

(21) Appl. No.: 11/501,872

(22) Filed: Aug. 10, 2006

(65) Prior Publication Data

US 2007/0028677 A1    Feb. 8, 2007

Related U.S. Application Data

(63) Continuation of application No. PCT/GB06/01526, filed on Apr. 10, 2006.

(30) Foreign Application Priority Data

Apr. 13, 2005 (GB) .................................. 0507423

(51) Int. Cl.
*G01C 17/38* (2006.01)
*G01P 21/00* (2006.01)

(52) U.S. Cl. ...................................................... 702/95

(58) Field of Classification Search .................. 702/94, 702/95, 150–153; 33/503, 559
See application file for complete search history.

(56) References Cited

U.S. PATENT DOCUMENTS

| | | | |
|---|---|---|---|
| 4,333,238 A | 6/1982 | McMurtry | |
| 4,888,877 A | 12/1989 | Enderle et al. | |
| 4,987,356 A | 1/1991 | Yamada et al. | |
| 4,991,304 A | 2/1991 | McMurtry | |
| 5,140,239 A | 8/1992 | Matsuura | |
| 5,189,806 A * | 3/1993 | McMurtry et al. | 33/503 |
| 5,579,246 A * | 11/1996 | Ebersbach et al. | 702/95 |
| 5,610,846 A * | 3/1997 | Trapet et al. | 702/95 |
| 6,154,713 A | 11/2000 | Peter et al. | |
| 6,412,329 B1 | 7/2002 | Nai | |
| 6,868,356 B2 | 3/2005 | Nai et al. | |
| 2006/0266100 A1* | 11/2006 | McMurtry et al. | 73/1.79 |

FOREIGN PATENT DOCUMENTS

| | | |
|---|---|---|
| EP | 0 364 057 A2 | 4/1990 |
| EP | 0 436 735 A1 | 7/1991 |
| WO | WO90/07097 | 6/1990 |
| WO | WO 02/04883 A1 | 1/2002 |
| WO | WO 03/074968 A1 | 9/2003 |

* cited by examiner

*Primary Examiner*—Michael Nghiem
(74) *Attorney, Agent, or Firm*—Oliff & Berridge, PLC

(57) ABSTRACT

Error correction of measurements of workpieces taken using a coordinate positioning apparatus in which the workpiece is mounted on a bed of the apparatus and a workpiece sensing probe is moved relative to the bed into a position sensing relationship with each workpiece and a position reading taken, and in which means are provided for measuring at least a function of the acceleration of the probe relative to the bed, the method including, in any suitable order: measuring the workpiece; determining the repeatable measurement errors from a predetermined error function, look-up table or map; measuring at least a function of the acceleration and calculating the unrepeatable measurement errors as the workpiece is measured; and combining the repeatable and non repeatable errors in steps (b) and (c) to determine the total errors; and using the total errors determined in step (d) to correct the measurements of the workpiece.

19 Claims, 8 Drawing Sheets

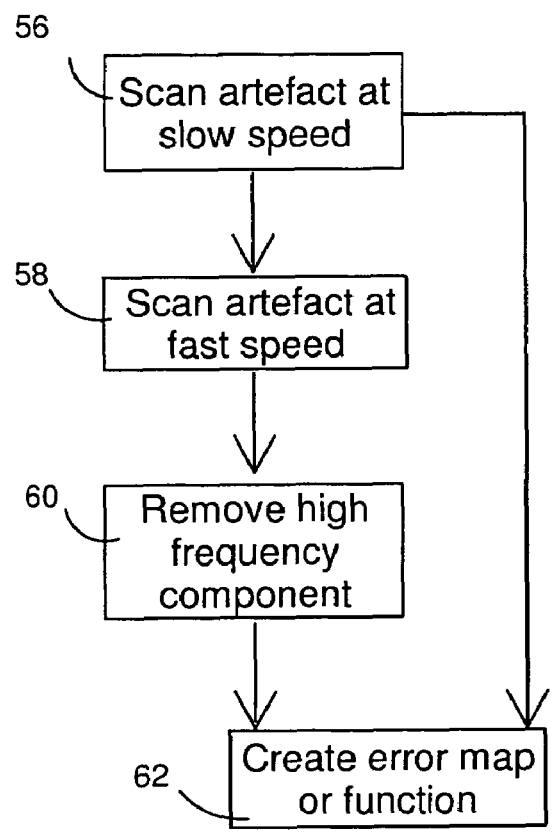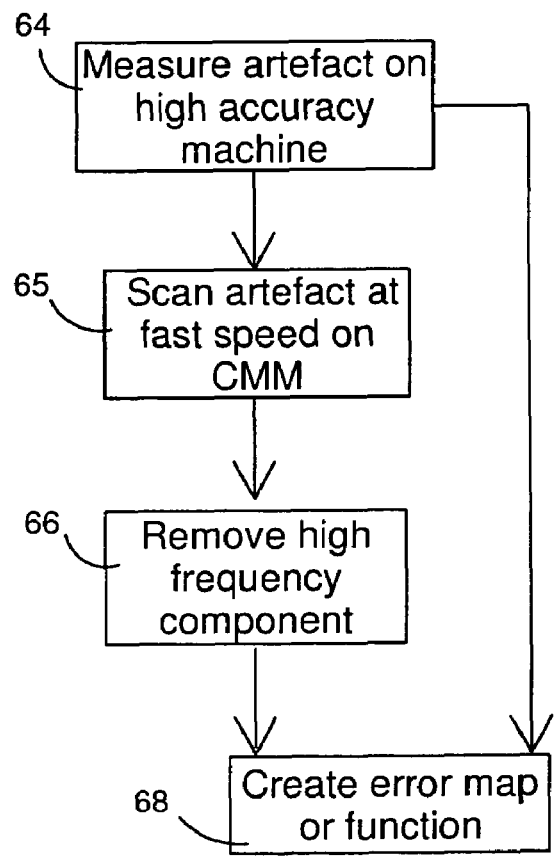
Fig 4
Fig 5

METHOD OF ERROR CORRECTION

The present invention relates to the measurement of workpieces with a coordinate positioning apparatus. A coordinate positioning apparatus may include coordinate measuring machines (CMM), machine tools, manual coordinate measuring arms and inspection robots. In particular the invention relates to the correction of errors in the measurements of workpieces.

It is common practice after workpieces have been produced to inspect them on a coordinate measuring machine (CMM) having a quill onto which a probe is mounted which can be driven in three orthogonal directions x,y,z within a working volume of the machine. It is also common to inspect workpieces using a probe mounted on a machine tool as part of process control.

Inaccuracies caused by the dynamic deflection of the machine may be reduced by slowing the machine and thereby causing the probe to travel very slowly as it contacts the workpiece surface.

Our earlier U.S. Pat. No. 4,333,238 discloses a method of compensating for the dynamic deflection of the machine when measurements are taken using a touch trigger probe. When measurements are taken at high speed, the required acceleration may cause dynamic deflection of the machine and the quill on which the probe is mounted, thus causing an error in the measurement reading of the workpiece. This is overcome by providing an accelerometer in the probe and thereby determining the dynamic deflection at the instant the touch trigger probe takes a measurement reading of the workpiece. Any measurements taken over an acceleration threshold may be repeated at a lower acceleration.

Our previous U.S. Pat. No. 4,991,304 discloses a method of inspecting a series of workpieces using a coordinate measuring machine (CMM) in which a probe is first calibrated or datumed for each intended direction of probe movement by touching it at a slow speed against a reference object such as a datum ball to provide a set of correction offsets which are stored in the computer and used for subsequent measurement.

The first workpiece to be measured is put on the CMM table and a set of points on the surface of the workpiece are measured at a slow speed to allow accurate readings to be taken. Measurement of the first workpiece is then repeated at a fast speed, the difference between the slow speed readings and the fast speed readings is calculated and stored. The stored error value for each measured point takes into account the dynamic deflection of the machine structure at the fast speed.

The next workpiece to be measured is set up on the CMM table and readings are taken at the fast speed. At this speed the readings are inaccurate but repeatable. Each fast reading is adjusted by adding the corresponding stored error value and thus compensating for errors induced by fast reading.

International Patent Application No. WO03/074968 discloses a method of inspecting a series of workpieces, in which an artefact is first calibrated on a high accuracy machine, for example a form measuring machine, and then placed on the coordinate positioning apparatus. The artefact is measured at a fast speed on the coordinate positioning apparatus and an error function or map is generated from the difference between the known form of the calibrated artefact and the measured form of the artefact measured on a coordinate positioning apparatus. This error function or map is used to correct the measurements of subsequent workpieces measured on the coordinate positioning apparatus at a fast speed. This has the advantage that the coordinate positioning apparatus does not need to be error mapped.

The methods disclosed in U.S. Pat. No. 4,991,304 and WO 03/074968 work well at speeds at which the behaviour of the machine remains repeatable. The smoother the drive system of the machine, the higher the speed that can be achieved without dynamic errors occurring which the correction map cannot correct.

Some coordinate positioning machines exhibit significant drive vibration at high speed. The main source of error causing the vibration is the machine mechanical drive and control system. Errors caused by these vibrations (typically above 5 Hz) are not suitable for the methods of compensation for dynamic errors described above as the vibration causes non repeatable behaviour at high speed which causes measurement errors.

U.S. Pat. No. 6,412,329 describes a method of reducing acceleration induced measurement errors by using accelerometers to measure accelerations of the probe. Acceleration signals are integrated to produce velocity signals of the moving part which are used in a velocity feedback control loop to provide correction signals.

European Patent EP1311799 discloses a method of correcting coordinate measurement errors produced by the position measuring devices of a CMM due to vibrations of parts of the machine. The accelerations of a moving part of the machine are measured, for example by accelerometers, and the acceleration values are double integrated to produce signals indicative of the displacement of the machine part due to the acceleration. Signals indicative of the displacement of the machine part are produced from the position measuring devices of the machine. A data fusion algorithm is used to process the two displacement signals so obtained to correct the measured values of the displacement produced by the machine for vibrations of the moving part.

Both these methods have the disadvantage that drift and noise on the accelerometer cause problems when attempting to correct low frequency errors (typically 0-5 Hz) and can thus result in unreliable correction.

The present invention provides a method of error correction of measurements of workpieces taken using a coordinate positioning apparatus in which the workpiece is mounted on a bed of the apparatus and a workpiece sensing probe is moved relative to the bed into a position sensing relationship with each workpiece and a position reading taken, and in which means are provided for measuring at least a function of the acceleration of the probe relative to the bed, the method comprising the following steps, in any suitable order:

(a) measuring the workpiece;
(b) determining the repeatable measurement errors from a predetermined error function, look-up table or map;
(c) measuring at least a function of the acceleration and calculating the unrepeatable measurement errors as the workpiece is measured; and
(d) combining the repeatable and non repeatable errors in steps (b) and (c) to determine the total errors; and
(e) using the total errors determined in step (d) to correct the measurements of the workpiece.

This method allows a more accurate representation of the workpiece as both repeatable and non repeatable errors are accommodated.

The repeatable errors are typically low frequency errors (e.g. less than 5 Hz). These may be due to the centrifugal force of the probe for example. The non repeatable errors are typically high frequency errors (e.g. greater than 5 Hz). These may be due to the machine vibration for example.

CMMs typically decouple mechanically at frequencies around 5-15 Hz, meaning that data above about 5 Hz may include machine vibration and thus be non repeatable.

The non repeatable errors may be determined using an accelerometer.

The method may include the step of determining the predetermined error function, look-up table or map.

The pre-determined error function, look-up table or map in step (b) may be determined by measuring an artefact of known dimensions at the measurement speed (preferably a fast speed), wherein the measurement error is determined from the difference between the known and measured dimensions.

The artefact may comprise one of the workpieces in the series of workpieces to be measured. Alternatively the artefact may have features having a similar size and shape to the features of the workpiece.

The form of the artefact may be determined by measuring said artefact on the coordinate positioning apparatus at a slow speed. Alternatively the form of the artefact may be determined by measuring it on a separate high accuracy coordinate positioning apparatus, for example a form measuring machine.

The predetermined error function, look-up table or map in step (b) may be determined by taking measurement readings of the artefact with the probe whilst oscillating the probe at a range of frequencies. The measurement error is determined from the difference between the known and measured dimensions. An error function, look-up table or map may thus be created from the relationship between probe acceleration and measurement error.

The step of measuring the artefact in step (a) may comprise scanning the artefact.

A second aspect of the present invention provides apparatus for correcting errors in the measurements of workpieces taken using a coordinate positioning apparatus in which the workpiece is mounted on a bed of the apparatus and a workpiece sensing probe is moved relative to the bed into a position sensing relationship with each workpiece and a position reading taken, and in which means are provided for measuring at least a function of the acceleration of the probe relative to the bed, the apparatus comprising a controller adapted to perform the following steps in any suitable order:
(a) measuring the workpiece;
(b) determining the repeatable measurement errors from a predetermined error function, look up table or map;
(c) measuring at least a function of the acceleration and calculating the unrepeatable measurement errors as the workpiece is measured;
(d) combining the repeatable and non repeatable errors in step (b) and (c) to determine the total errors; and
(e) using the total errors determined in step (d) to correct the measurements of the workpiece.

A third aspect of the present invention provides a method of error correction of measurements of workpieces taken using a coordinate positioning apparatus in which the workpiece is mounted on a bed of the apparatus and a workpiece sensing probe is moved relative to the bed into a position sensing relationship with each workpiece and a position reading taken, and in which means are provided for determining at least a function of the acceleration of the probe relative to the bed, the method comprising the following steps:
scanning an artefact with a workpiece measuring probe whilst simultaneously determining the acceleration or a function of acceleration at the probe;
comparing the measured dimensions of the artefact to the known dimensions of the artefact to determine the measurement error;
creating an error function, map or look-up table which relates at least acceleration or a function of acceleration at the probe to measurement error;
scanning subsequent workpieces whilst simultaneously determining at least acceleration or a function of the acceleration at the probe;
and identifying the measurement correction from said measured acceleration or function of acceleration and the error function, map or look up table.

The error function, map or look-up table may contain other variables. For example another variable may comprise velocity.

A fourth aspect of the present invention provides a method of error correction of measurements of workpieces in which the workpiece is mounted on a bed of the apparatus and a workpiece sensing probe is moved relative to the bed into a position sensing relationship with each workpiece and position reading taken, and in which means are provided for determining at least a function of the acceleration of the probe relative to the bed, the apparatus comprising a controller adapted to perform the following steps in any suitable order:
scanning an artefact with a workpiece measuring probe whilst simultaneously determining the acceleration at the probe;
comparing the measured dimensions of the artefact to the known dimensions of the workpiece to determine the measurement error;
creating an error function, map or look-up table which relates at least acceleration or a function of acceleration at the probe to measurement error;
scanning subsequent workpieces whilst simultaneously determining at least acceleration or a function of acceleration at the probe;
and identifying the measurement correction from said measured acceleration or function of acceleration and the error function, map or look up table.

Preferred embodiments of the invention will now be described by way of example with reference to the accompanying drawings wherein:

FIG. 4 is a flow diagram of a first method for determining the predetermined error map or function of FIG. 3;

FIG. 5 is a flow diagram of a second method for determining the predetermined error map or function of FIG. 4;

Figure 1:
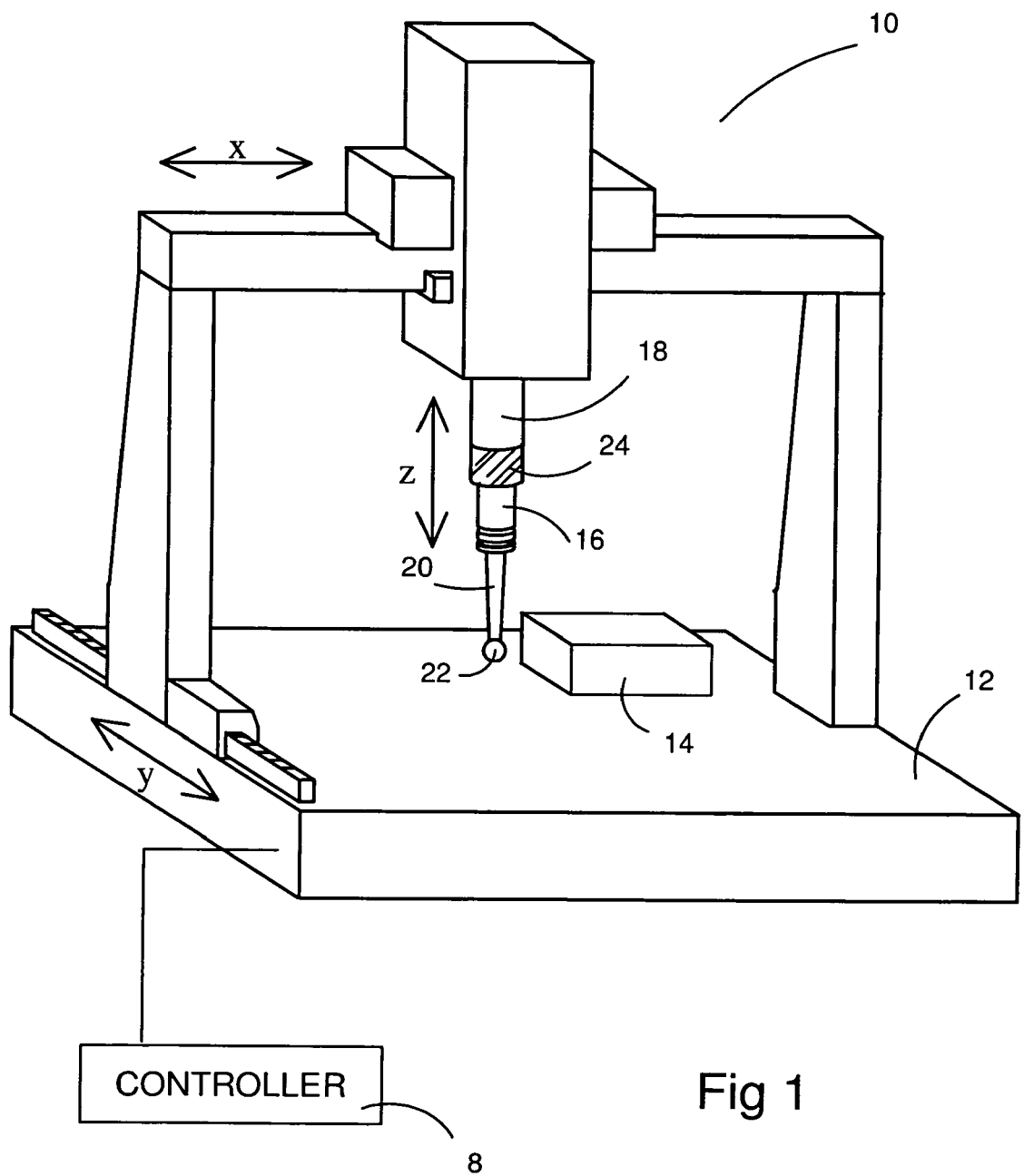
FIG. 1 is a schematic diagram of a coordinate measuring machine (CMM)

FIG. 1 illustrates a coordinate measuring machine (CMM) 10 which comprises a table 12 upon which a workpiece 14 to be measured may be placed. Preferably this is done by automatic means (not shown) which places each of a succession of substantially identical workpieces from a production run in at least nominally the same position and orientation on the table. An analogue probe 16 having a deflectable stylus 20 with a workpiece contacting tip 22 is mounted on a quill 18 of the machine, although other types of probes (including touch trigger probes) may be used. The quill and probe may move together in x,y and z directions under the action of x,y and z drives controlled by a computer. X,y and z scales (which include counters for the output of the scales) show the instantaneous coordinates of the position of the quill 18, on which the probe 16 is mounted, in three dimensions. Signals from the probe 16 indicating the deflection of the probe stylus 20 are combined with the readings from the x,y and z scales of the CMM to calculate the position of the stylus tip 22 and thus the surface of the workpiece 14.

Alternatively, with a touch trigger probe, a signal indicating that the probe has contacted the surface of the workpiece freezes the output from the scales and the computer takes a reading of the x,y,z coordinates of the workpiece surface.

During scanning of the workpiece, radial measurement errors are detected both when the probe is moving or stationary. This is due to vibration of the machine structure. As the radial velocity of the probe is small during scanning (whilst the tangential velocity is relatively high), the effect of this radial velocity on measurement error is small. This is opposite to the case in touch trigger measurement in which radial measurement errors are caused due to the high radial velocity of the probe as it approaches the workpiece.

As thus far described the machine is conventional. A controller 8, such as a computer contains a program which causes the probe 16 to scan the surface of the workpiece 14 or for a touch trigger probe to contact the surface of the workpiece at a plurality of different points, sufficient to take all the required dimensions and form of the workpiece for the inspection operation required. This controller may be used to control the subsequent steps as described below.

Figure 2:
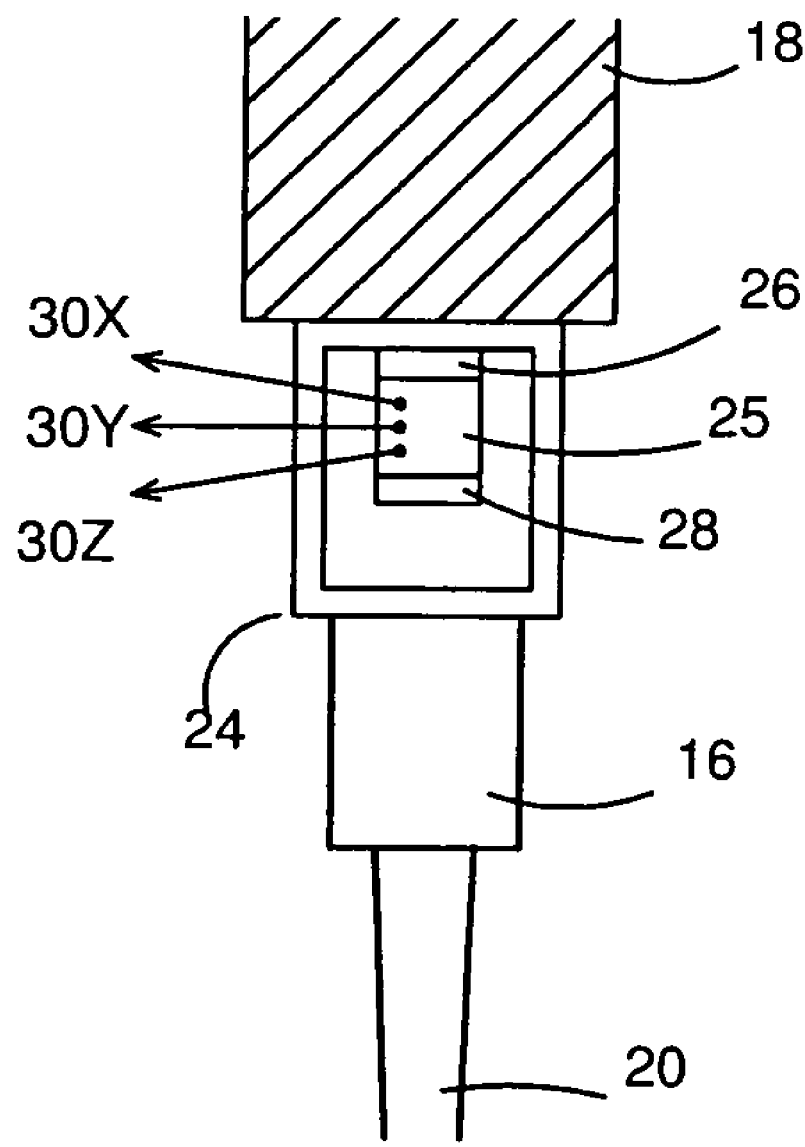
FIG. 2 shows the detail of the accelerometer of FIG. 1.

An accelerometer 24 is provided in a housing directly connected between the quill 18 and the housing of the probe 16. FIG. 2 illustrates the accelerometer which may comprise, for example, a known arrangement of piezoelectric crystals 25 connected between a base 26 and a free mass 28. Outputs 30X, 30Y, 30Z are derived from the crystals to carry the electric current generated in respect of initial forces acting on the mass in the x,y and z direction respectively. The accelerometer thus measures the acceleration experienced by the probe in x,y and z. Alternatively the accelerometer may be made from micro-machined silicon. Any type of accelerometer may be used which enables acceleration at the probe to be measured.

Figure 3:
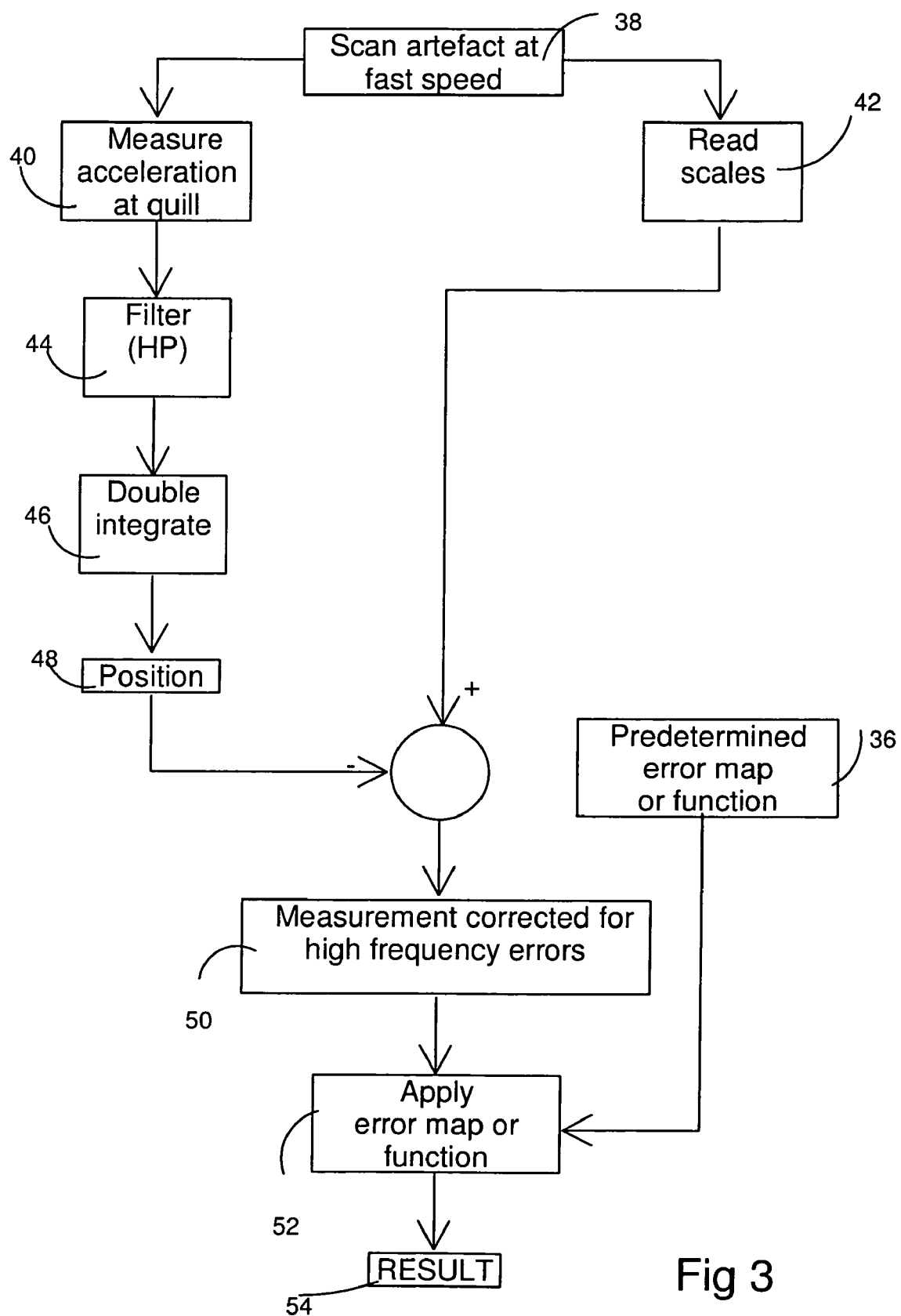
FIG. 3 is a flow diagram of the first embodiment of the invention.

A first embodiment of the invention will be described with reference to the flow diagram of FIG. 3. A workpiece is placed on the table of the coordinate measuring machine.

The workpiece is measured at a fast speed 38 and the output from the accelerometer is recorded 40 simultaneously with the machine scales 42.

The output from the accelerometer 40 is filtered with a high pass filter 44 and the result is double integrated 46 to produce a position reading 48. This position reading is the measurement error caused by high frequency acceleration.

The outputs of the machine scales 42 are corrected with the position reading 48 to produce the measurement corrected for high frequency errors 50. This measurement 50 is corrected for low frequency errors by applying a predetermined low frequency error map 36 in step 52. This produces a measurement 54 corrected for both high and low frequency errors.

The predetermined error map may be determined in a variety of ways. FIG. 4 illustrates a first method of determining the predetermined error map or function. In this method an artefact is placed on the table of the coordinate measuring machine, preferably in the same position and orientation as a previous/subsequent workpieces. The artefact may comprise a workpiece in a series of workpieces to be measured. Alternatively the artefact may have features which substantially match the size and location of features in the series of workpieces.

The artefact is measured at a slow speed 56 with the probe to determine the accurate form of the artefact. By measuring the artefact slowly, dynamic errors are eliminated. Furthermore use of a calibrated probe and machine ensures that static errors are minimised. Thus an accurate measurement of the artefact is achieved.

The artefact is then measured at a fast speed 58 with the workpiece contacting probe. Preferably the workpiece remains in the same position and the same orientation for the slow and fast scans.

The high frequency element of the measurement error is removed from the fast scan data 60. This may be achieved by either filtering the measurement data with a low pass filter or by removing the high frequency measurement error previously determined in step 48 of FIG. 3.

Thus for each measured point on the surface of the artefact, both its correct position and its measured position at fast speed are known. The low frequency repeatable dynamic error relating to that point on the surface may be determined by taking the difference between the known position of that point (determined by the slow scan 56) and the measurement of that point taken at a fast speed with the high frequency element removed 60. A low frequency error function or map 62 can thus be created which compensates for the repeatable error (size and low frequency form).

A second method of determining the predetermined function or map of low frequency errors is illustrated in FIG. 5. In this method, the form of the artefact is determined by measuring it on a separate high accuracy machine 64, for example a form measuring machine or roundness machine. This has the advantage that there is no requirement for the CMM to be corrected for geometric errors. It also has the advantage of speeding up the process and reducing calibration cost, as the CMM will no longer require regular calibration.

The artefact is then measured at a fast speed with the workpiece contacting probe on the machine on which subsequent measurements will be carried out 65. As in the first method described above, the high frequency error component is removed from the fast scan data 66. As before this may be done by using a low pass filter or using the data determined in step 48 in FIG. 3. The predetermined error function or map 68 is determined from the difference between the known dimensions of the artefact 64, from measuring it on the high accuracy machine, and the dimensions measured at a fast speed on the CMM with the high frequency components removed 66.

Figure 6:
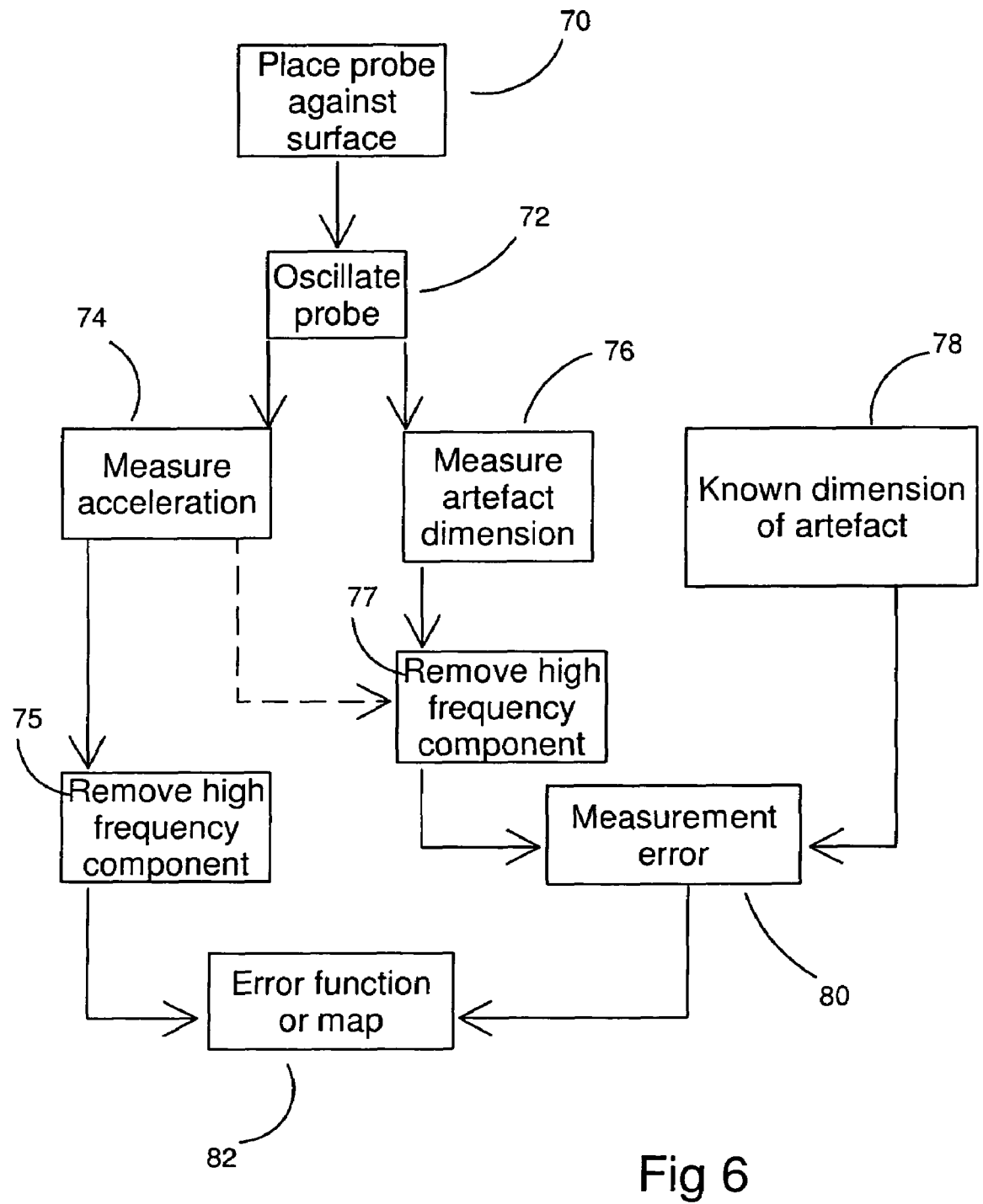
FIG. 6 is a flow diagram of a third method for determining the predetermined error map or function of FIG. 5.

A third method of determining the predetermined error function or map of low frequency errors is illustrated in FIG. 6.

The probe is placed against the surface of the artefact 70 and the probe is oscillated 72 at a range of frequencies whilst the stylus tip remains in contact with the surface. This may comprise a sinewave oscillation. The acceleration of the probe is measured 74 by the accelerometer simultaneously with the measurement of the artefact 76. The acceleration of the probe may also be determined by reading the machine scales and double differentiating the scale readings. The high frequency component is removed 75, 77 from both the measured dimensions of the artefact 76 and the acceleration data. As before, this may be done using a low pass filter or using the data determined in step 45 in FIG. 3. Alternatively, for step 75, this may be done by using the acceleration data obtained in step 74. The measurement error 80 is determined from the difference between the measurement of the artefact 76 (with high frequency component removed 75) and the known dimension of the artefact 78. An error function or map 82 may be created relating the acceleration 74 to the measurement error 80.

The sinewave oscillation is carried out at two or more locations on the artefact to enable two or more error components to be determined. The locations may be in directions which match the machine drives (e.g. aligned with the X and Y axes of the system). Preferably these are done 90° apart for ease of calculation. Once an error function or map has been created relating the components of measurement error to acceleration, a corresponding error correction can be applied to any measurement of the artefact.

Figure 7:
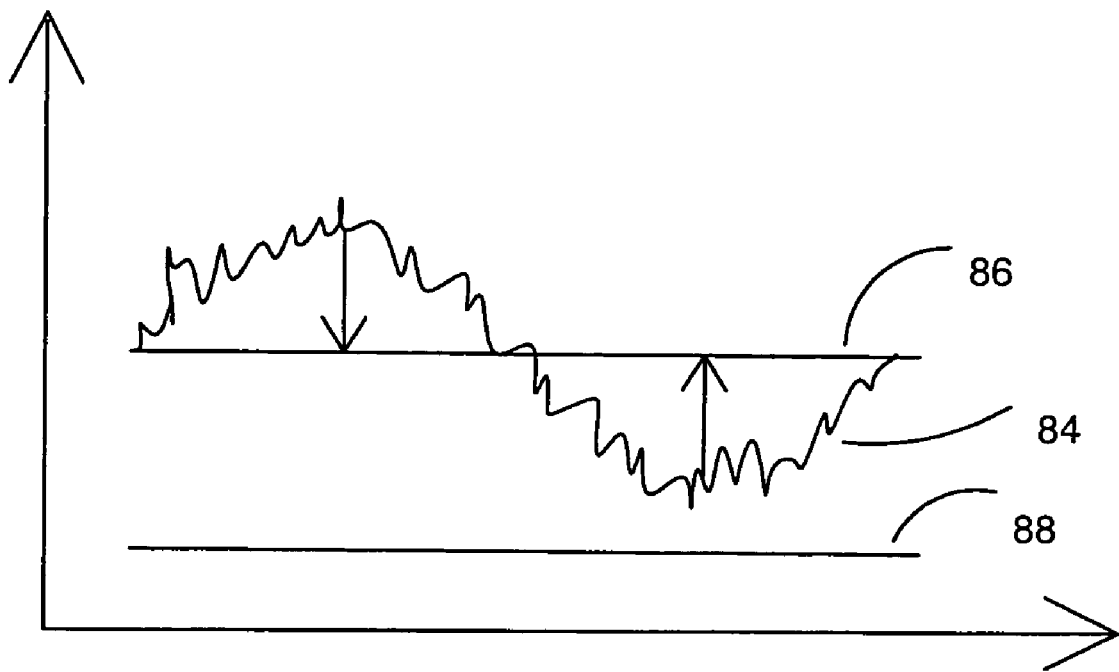
FIG. 7 illustrates the uncorrected measurement data, and measurement data corrected for high and low frequency accelerations.

FIG. 7 illustrates the measured and corrected position readings of an artefact. Line 84 illustrates the scale outputs without any error correction. Line 86 represents the measurement which has been corrected for the high frequency error. Line 88 represents the measurement which has been corrected for both the high and low frequency errors.

Figure 8:
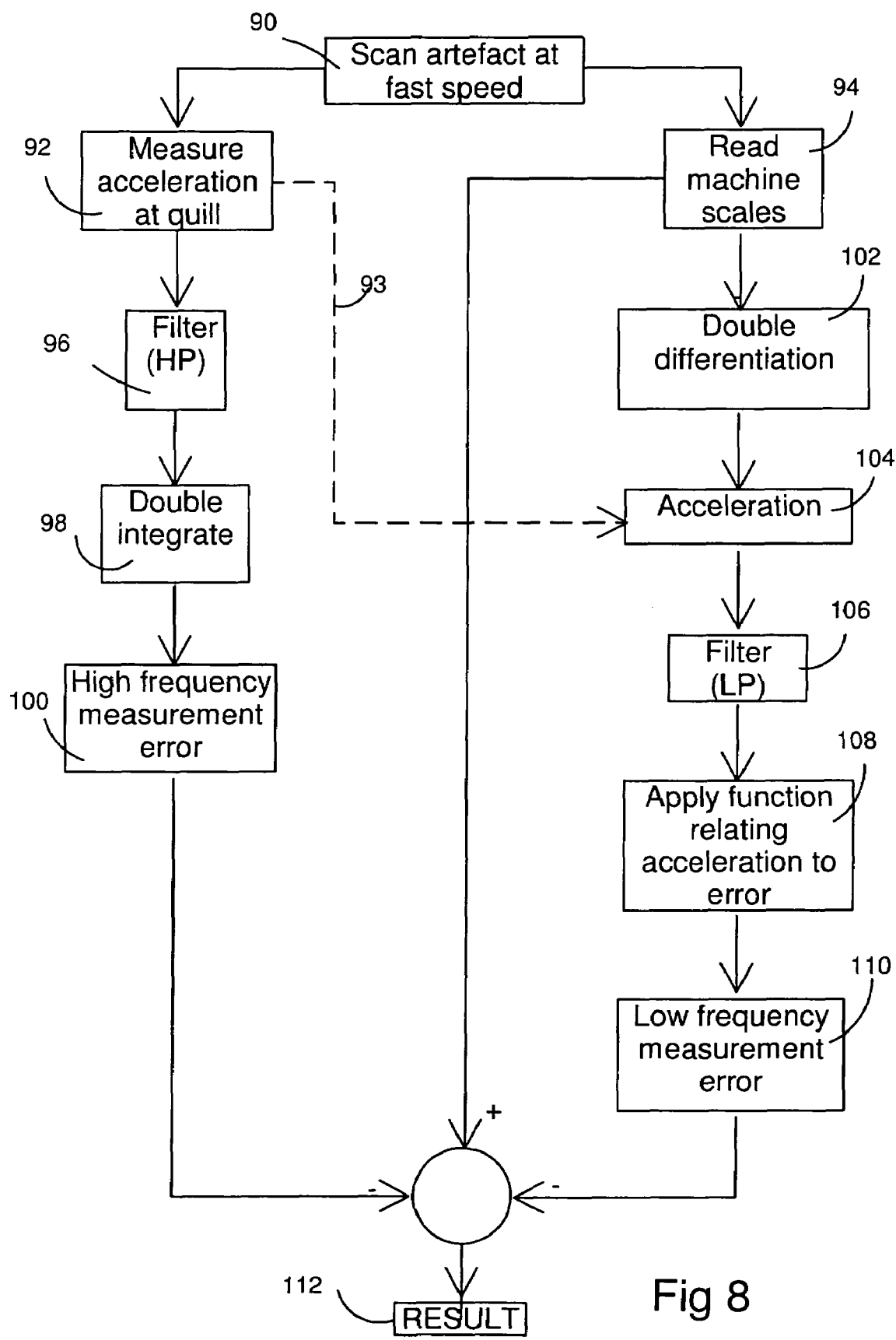
FIG. 8 is a flow diagram at a second embodiment of the invention.

A second embodiment of the invention will now be described with reference to FIG. 8.

An artefact is placed on the CMM and measured at fast speed 90. The acceleration at the quill 92 is measured by an accelerometer. The machine scales are read 94 simultaneously with the acceleration 92.

The acceleration 92 measured by the accelerometer is filtered with a high pass filter 96 and double integrated 98 to produce a measurement error 100 relating to high frequency errors.

The scale outputs 94 are double differentiated 102 to produce an acceleration reading 104. This is filtered with a low pass filter 106. Alternatively, the acceleration data may be taken from the accelerometer 92 as shown by dashed line 93. A predetermined low frequency error function or map relating acceleration to measurement error 108 is applied to the filtered acceleration reading to produce a low frequency measurement error 110. The predetermined low frequency error function or map may be determined by the method described with reference to FIG. 6. The steps 102-110 may be replaced by any of the methods for determining low frequency measurement error as described with reference to FIGS. 4-6.

Both the high frequency measurement error 100 and the low frequency measurement error 110 are applied to the machine scale readings 94 to produce an error corrected measurement 112.

In the above embodiments, the error function or map only includes x and y acceleration components for simplicity. However, the error function or map may include x,y and z acceleration components. In order for the z acceleration components to be included, the measurement of the artefact at the fast speed must have a measurement profile which includes acceleration in z, for example it may contain compound angles or could comprise spiral scans on a sphere.

It is preferable that the accelerometer is calibrated on the machine it is to be used on so that the sensitivities of the accelerometer and machine can be matched, allowing accurate correlation between the sensed vibration and the deflection error.

One method of calibrating the accelerometer is to position the stylus tip of the probe against a fixed object, such as a datum ball, and to drive the machine with a frequency sweep as the outputs from the accelerometers are read. The apparent change in dimension of the fixed object can be related to the measured vibration from the accelerometer.

This method can be achieved by scanning an artefact of known form, such as a datum sphere or ring gauge. The higher frequency error component results in a perceived form ripple error on the artefact measurement data. The mathematical relationship between the form ripple error and the accelerometer outputs can be calculated to calibrate the system.

For most accurate results, the accelerometers are placed directly on the surface sensing probe. However, it may not be practical to place them directly at the point of measurement, but the closer the better.

The vibrational/high frequency component can also be measured in other ways. For example, a suspended mass on a spring system, in which the deflection of the mass is measured, preferably by non contact means.

Matched filters may be used so that the measurements are corrected across the full frequency range.

A data combination algorithm is used to combine the measurement errors caused by high and low frequency accelerations.

In a third embodiment of the invention, a look-up table is created which relates acceleration to measurement error.

In order for the look-up table to be created, a set of measurement data corresponding to acceleration across a frequency range must be determined. This data may be determined using the sinewave oscillation described in FIG. 6.

The data for the look-up table may also be determined by measuring an artefact of known dimensions several times whilst recording the acceleration. A range of acceleration data and measurement data is thus created for several positions on the artefact, which may be used to create the look-up table.

Figure 9:
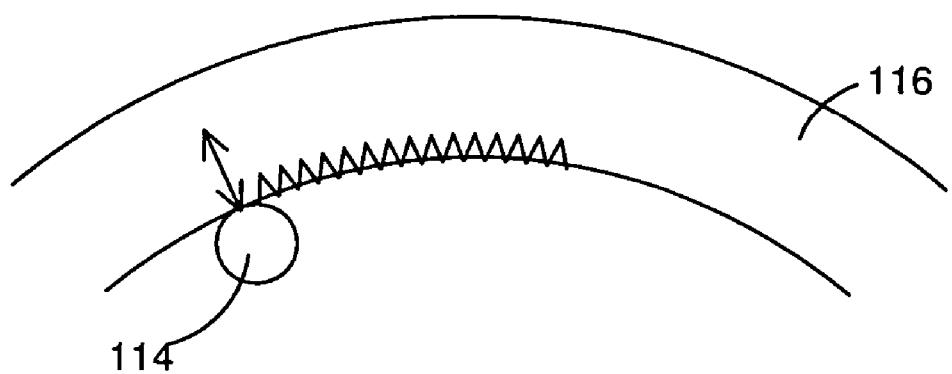
FIG. 9 is an illustration of the probe radially oscillating whilst scanning the surface of an artefact.

Another method of creating the data required for the look-up table is illustrated in FIG. 9. The artefact is measured by oscillating the probe tip 114 radially against the surface 116 as it moves in a path along the surface. In this manner a range of acceleration data and measurement data is created.

Figure 10:
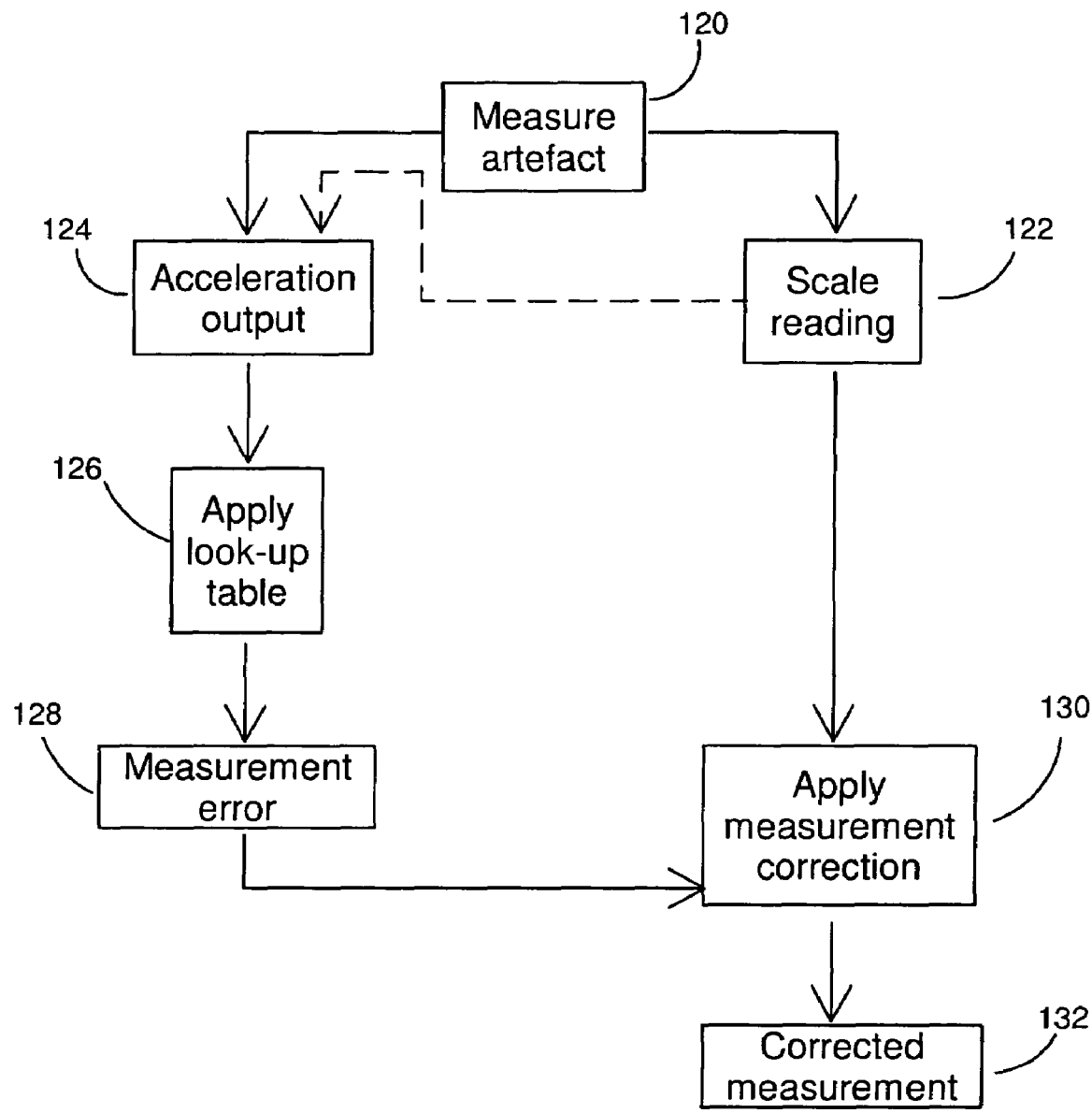
FIG. 10 is a flow diagram of a third embodiment of the invention.

Once the look-up table has been created scale measurement can be error corrected as will be described with reference to FIG. 10. An artefact is measured 120 whilst simultaneously recording the scale readings 122 and acceleration 124. The acceleration 124 may be determined from the accelerometer. Alternatively, data from scale reading 122 may be double differentiated to produce an acceleration output, as shown by the dashed line. The look-up table 126 is applied to the accelerometer output 124 to determine the measurement error 128. The measurement error 128 is used to create a measurement correction 130 to the scale readings 122 and thus produce a corrected measurement 132.

The look-up table may be replaced by an error map or function. The look-up table (or error map or function) may contain variables other than acceleration. For example, the look-up table may contain velocity data.

This could be measured directly or derived from the scale readings or accelerometer readings. This method corrects for errors caused both high and low frequency acceleration and does not differentiate between the two.

All the embodiments above describe a CMM comprising a stationary bed and a movable probe. However the embodiments are also suitable for a machine comprising a stationary probe (or only movable in one axis) and a moving bed. In this case the acceleration of the bed is measured rather than the acceleration of the probe. This may be achieved by placing accelerometers on the machine bed. In all cases the acceleration of the moving part is measured relative to the machine scales.

All of the embodiments of this invention allow high speed measurement using machines with significant drive vibration.

All the methods are also suitable for use with non-contact probes for example optical or capacitance probes.

The invention claimed is:

1. A method of error correction of one or more measurements of one or more workpieces taken using a coordinate positioning apparatus in which each workpiece is mounted on a bed of the apparatus and a workpiece sensing probe is moved relative to the bed into a position sensing relationship with each workpiece and a position reading taken, and in which means are provided for measuring at least a function of an acceleration of the probe relative to the bed, the method comprising the following steps, in any suitable order:
   (a) measuring a workpiece;
   (b) determining one or more repeatable measurement errors from a predetermined error function, look-up table or map;
   (c) measuring at least the function of the acceleration of the probe and calculating one or more non-repeatable measurement errors as the workpiece is measured; and
   (d) combining the repeatable and non-repeatable measurement errors in steps (b) and (c) to determine one or more total errors; and
   (e) using the total errors determined in step (d) to correct measurements of the workpiece taken using the coordinate positioning apparatus.

2. A method according to claim 1 wherein the repeatable measurement errors are low frequency errors.

3. A method according to claim 2 wherein the low frequency errors have a frequency of less than 5 Hz.

4. A method according to claim 1 wherein the non-repeatable measurement errors are high frequency errors.

5. A method according to claim 4 wherein the high frequency errors have a frequency greater than 5 Hz.

6. A method according to claim 1 wherein the non-repeatable measurement errors are determined using an accelerometer.

7. A method according to claim 1 wherein the method includes the step of determining the predetermined error function, look-up table or map.

8. A method according to claim 1 wherein the predetermined error function, look-up table or map in step (b) is determined by measuring an artefact of known dimensions at a measurement speed, wherein one or more measurement errors are determined from one or more differences between the known dimensions and measured dimensions.

9. A method according to claim 8 wherein the artefact comprises one workpiece in a series of workpieces to be measured.

10. A method according to claim 8 wherein the artefact has features which have a similar size and shape to features of the workpiece.

11. A method according to claim 8 wherein a form of the artefact is determined by measuring the artefact on the coordinate positioning apparatus at a slow speed.

12. A method according to claim 8 wherein a form of the artefact is determined by measuring the artefact on a separate high accuracy coordinate positioning apparatus.

13. A method according to claim 1 wherein the predetermined error function, look-up table or map in step (b) is determined by taking measurement readings of an artefact with the probe while oscillating the probe at a range of frequencies.

14. A method according to claim 1 wherein the step of measuring a workpiece in step (a) comprises scanning the workpiece.

15. Apparatus for correcting errors in one or more measurements of one or more workpieces using a coordinate positioning apparatus in which each workpiece is mounted on a bed of the apparatus and a workpiece sensing probe is moved relative to the bed into a position sensing relationship with each workpiece and a position reading taken, and in which means are provided for measuring at least a function of an acceleration of the probe relative to the bed, the apparatus comprising a controller adapted to perform the following steps in any suitable order:
   (a) measuring a workpiece;
   (b) determining one or more repeatable measurement errors from a predetermined error function, look up table or map;
   (c) measuring at least the function of the acceleration of the probe and calculating one or more non-repeatable measurement errors as the workpiece is measured;
   (d) combining the repeatable and non-repeatable measurement errors in step (b) and (c) to determine one or more total errors; and
   (e) using the total errors determined in step (d) to correct measurements of the workpiece.

16. A method of error correction of one or more measurements of workpieces taken using a coordinate positioning apparatus in which each workpiece is mounted on a bed of the apparatus and a workpiece sensing probe is moved relative to the bed into a position sensing relationship with each workpiece and a position reading taken, and in which means are provided for determining at least a function of an acceleration of the probe relative to the bed, the method comprising:
   scanning an artefact with a workpiece measuring probe while simultaneously determining a first acceleration or a first function of the first acceleration at the probe;
   comparing one or more measured dimensions of the artefact to one or more known dimensions of the artefact to determine a measurement error;
   creating an error function, map or look-up table which relates at least the acceleration or a function of the acceleration of the probe to the measurement error;
   scanning a subsequent workpiece while simultaneously determining at least a second acceleration or a second function of the second acceleration at the probe; and
   identifying a measurement correction of measurements using the coordinate positioning apparatus from the second acceleration or the second function of the second acceleration and the error function, map or look up table.

17. A method according to claim 16 wherein the error function, map or look-up table contains other variables.

18. A method according to claim 17 wherein the other variables comprises velocity.

19. Apparatus for error correction of one or more measurements of workpieces in which each workpiece is mounted on a bed of the apparatus and a workpiece sensing probe is moved relative to the bed into a position sensing relationship with each workpiece and a position reading taken, and in which means are provided for determining at least a function of an acceleration of the probe relative to the bed, the apparatus comprising a controller adapted to perform the following steps in any suitable order:

scanning an artefact with a workpiece measuring probe while simultaneously determining the acceleration of the probe;

comparing one or more measured dimensions of the artefact to known dimensions of a workpiece to determine a measurement error;

creating an error function, map or look-up table which relates at least the acceleration or a function of the acceleration of the probe to the measurement error;

scanning subsequent workpieces while simultaneously determining at least the acceleration or the function of the acceleration of the probe;

and identifying a measurement correction from the acceleration or the function of the acceleration of the probe and the error function, map or look up table.

* * * * *